US012667092B2

(12) United States Patent
    Rupp

(10) Patent No.: US 12,667,092 B2
(45) Date of Patent: Jun. 30, 2026

(54) FLY TYING TOOL

(71) Applicant: Quarry Trail, LLC, Salt Lake City, UT (US)

(72) Inventor: David Alonzo Rupp, Salt Lake City, UT (US)

(73) Assignee: Quarry Trail, LLC, Salt Lake City, UT (US)

( * ) Notice: Subject to any disclaimer, the term of this patent is extended or adjusted under 35 U.S.C. 154(b) by 0 days.

(21) Appl. No.: 19/277,186

(22) Filed: Jul. 22, 2025

(65) Prior Publication Data

US 2026/0047563 A1      Feb. 19, 2026

Related U.S. Application Data

(60) Provisional application No. 63/683,082, filed on Aug. 14, 2024.

(51) Int. Cl.
    *A01K 97/26*      (2006.01)
    *H01F 7/02*      (2006.01)
(52) U.S. Cl.
    CPC ............ *A01K 97/26* (2013.01); *H01F 7/0252* (2013.01)
(58) Field of Classification Search
    CPC .............................. A01K 97/26; H01F 7/0252
    USPC ........................................... 289/17; 43/42.08
    See application file for complete search history.

(56) References Cited

U.S. PATENT DOCUMENTS

| | | | | |
|---|---|---|---|---|
| 2,478,255 A | * | 8/1949 | Drow ..................... | A01K 97/26 |
| | | | | 223/104 |
| 3,680,248 A | * | 8/1972 | Wilkinson ............. | A01K 97/18 |
| | | | | 43/53.5 |
| 4,573,719 A | * | 3/1986 | Aldridge ................ | A01K 91/04 |
| | | | | 289/17 |
| 5,324,298 A | * | 6/1994 | Phillips .............. | A61B 17/0469 |
| | | | | 289/17 |
| 5,397,326 A | * | 3/1995 | Mangum ............ | A61B 17/0469 |
| | | | | 606/139 |
| 5,685,037 A | * | 11/1997 | Fitzner ................... | A01K 91/04 |
| | | | | 7/106 |
| 6,550,177 B1 | * | 4/2003 | Epple, Jr. ............... | A01K 97/26 |
| | | | | 289/17 |
| 6,716,224 B2 | * | 4/2004 | Singhatat ........... | A61B 17/0469 |
| | | | | 606/144 |
| 7,744,051 B2 | * | 6/2010 | Joyce ....................... | A47G 1/17 |
| | | | | 248/467 |
| 2015/0048616 A1 | * | 2/2015 | Mashhour .............. | A01K 91/04 |
| | | | | 289/1.5 |
| 2015/0327528 A1 | * | 11/2015 | O'Neal .................... | D03J 3/00 |
| | | | | 289/17 |
| 2016/0219856 A1 | * | 8/2016 | Henderson ............. | A01K 97/24 |
| 2017/0273289 A1 | * | 9/2017 | Harshbarger .......... | A01K 97/26 |
| 2021/0071328 A1 | * | 3/2021 | Rees ........................ | D04B 3/04 |

* cited by examiner

*Primary Examiner* — Bao-Thieu L Nguyen
(74) *Attorney, Agent, or Firm* — Kirton McConkie; Brian Tucker

(57)          ABSTRACT

A fly tying tool can include a base and a shaft that rotates relative to the base. The shaft can form a fly securing portion that includes a magnet by which a fly can be secured to the shaft. The fly securing portion can also include a hook feature spaced from the magnet to form a recess in which the fly may be placed. The shaft can include a threading structure in the form of a spiral to facilitate threading a line through the eye of a hook.

20 Claims, 12 Drawing Sheets

FLY TYING TOOL

BRIEF SUMMARY

Embodiments of the present disclosure are generally directed to a fly tying tool. A fly tying tool can include a base and a shaft that rotates relative to the base. The shaft can form a fly securing portion that includes a magnet by which a fly can be secured to the shaft. The fly securing portion may include a hook feature spaced from the magnet to form a recess in which the fly may be placed. The shaft may include a threading structure in the form of a spiral to facilitate threading a line through the eye of a hook.

In some embodiments, a fly tying tool can include a base and a shaft coupled to the base. The shaft can include a fly securing portion having a magnet for securing a fly.

In some embodiments, the shaft is rotatably coupled to the base.

In some embodiments, the fly securing portion includes a hook feature that is spaced from the magnet to form a recess in which the fly is placed.

In some embodiments, the magnet is positioned at a face of the fly securing portion.

In some embodiments, the fly securing portion includes grips on opposing sides of the face.

In some embodiments, the magnet is positioned within an opening in the face and the opening includes a lip to retain the magnet at the face.

In some embodiments, the hook feature extends from a first end of the shaft and overtop the magnet.

In some embodiments, the shaft includes a gripping portion that is spaced from the fly securing portion by a first connecting portion.

In some embodiments, the shaft includes an extension portion that is spaced from the gripping portion by a second connecting portion.

In some embodiments, one or both of the first connecting portion and second connecting portion are narrowed portions of the shaft.

In some embodiments, the base includes a channel through which a coupling portion of the shaft extends to couple the shaft to the base.

In some embodiments, the coupling portion comprises arms with tabs that interface with a ledge formed in the channel.

In some embodiments, the base includes a hollow interior and openings.

In some embodiments, the shaft includes a threading structure.

In some embodiments, the threading structure comprises a spiral having a bottom end and a top end and a central channel that extends from the bottom end to the top end.

In some embodiments, the top end of the spiral forms an eye receiving area for aligning an eye of the fly over the central channel.

In some embodiments, the eye receiving area is positioned adjacent to the magnet.

In some embodiments, the threading structure is formed on an extension from the shaft.

In some embodiments, the threading structure is integrated into the shaft.

In some embodiments, a fly tying tool may include a base and a shaft coupled to the base. The shaft may include a threading structure forming a spiral having a bottom end and a top end and a central channel that extends from the bottom end to the top end.

In some embodiments, the top end of the spiral forms an eye receiving area.

In some embodiments, the shaft is configured to rotate relative to the base and the spiral is configured such that, as the shaft is rotated, a line routed through the central channel is rotated through the spiral until the line is freed from the spiral.

In some embodiments, the shaft includes a fly securing portion having a magnet for securing a fly.

In some embodiments, a fly tying tool may include a base having a first end and a second end and a channel that extends from the first end to the second end. The fly tying tool may also include a shaft comprising a first end forming a fly securing portion and a second end forming a coupling portion that inserts into the channel to secure the shaft to the base. The fly securing portion includes a magnet for securing a fly to the shaft.

In some embodiments, the fly securing portion includes a hook feature that is positioned overtop the magnet.

In some embodiments, the shaft includes a gripping portion positioned between the fly securing portion and the coupling portion.

In some embodiments, the shaft includes an extension portion between the gripping portion and the coupling portion. The extension portion may be configured to position the gripping portion in a user's fingertips when the base is in the user's palm.

In some embodiments, the fly securing portion includes grips on opposing sides of the magnet.

In some embodiments, a fly tying tool includes a base and a shaft forming a fly securing portion. The fly securing portion includes a magnet and a hook feature that is spaced from the magnet to form a recess in which a fly is placed to secure the fly to the magnet.

In some embodiments, the shaft rotates relative to the base.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

These drawings depict only example embodiments and should not be considered limiting of the scope of the disclosed embodiments.

DETAILED DESCRIPTION

Figure 1A:
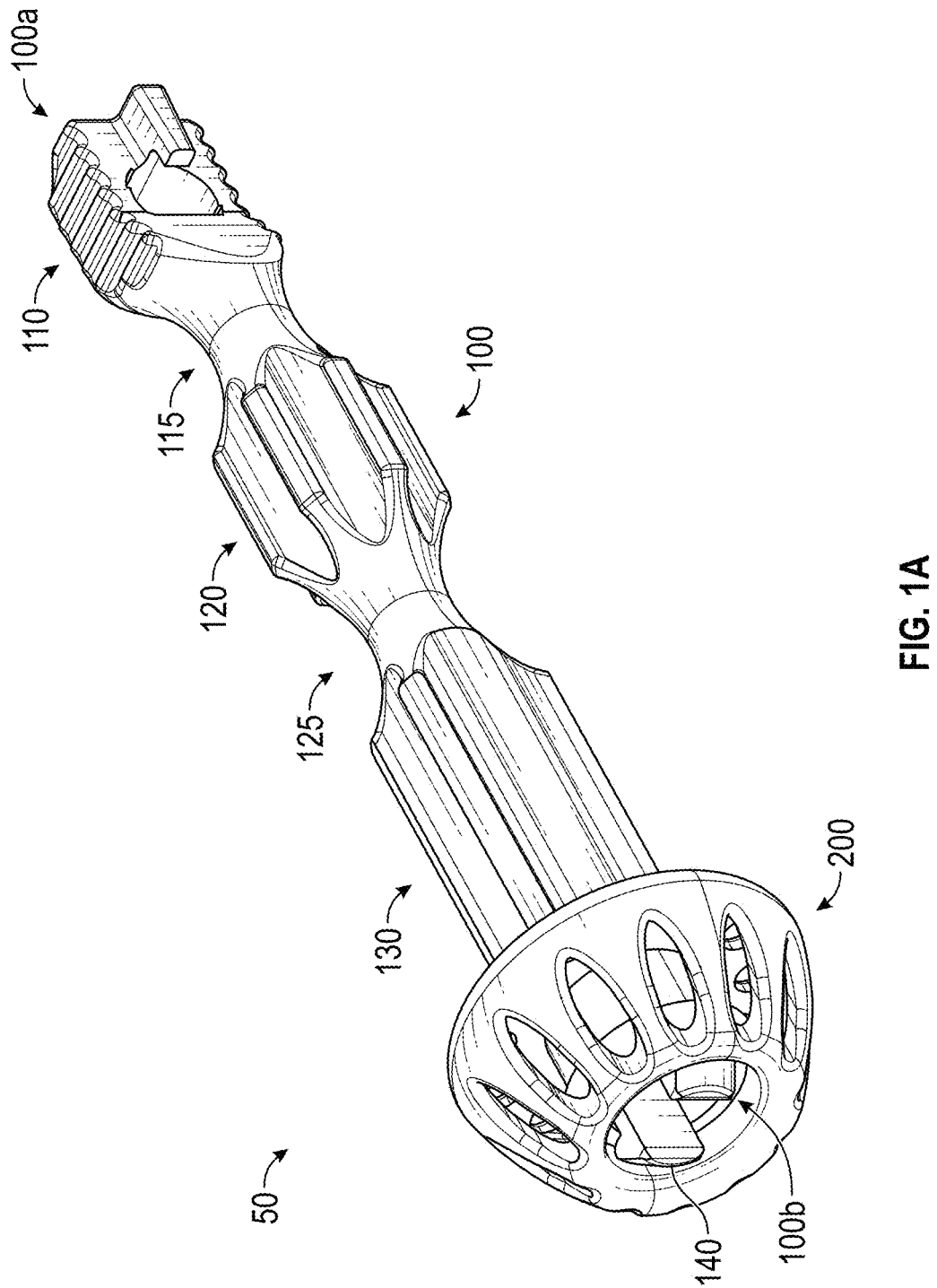
FIG. 1A is a perspective view of a fly tying tool that is configured in accordance with one or more embodiments of the present disclosure.
Figure 1B:
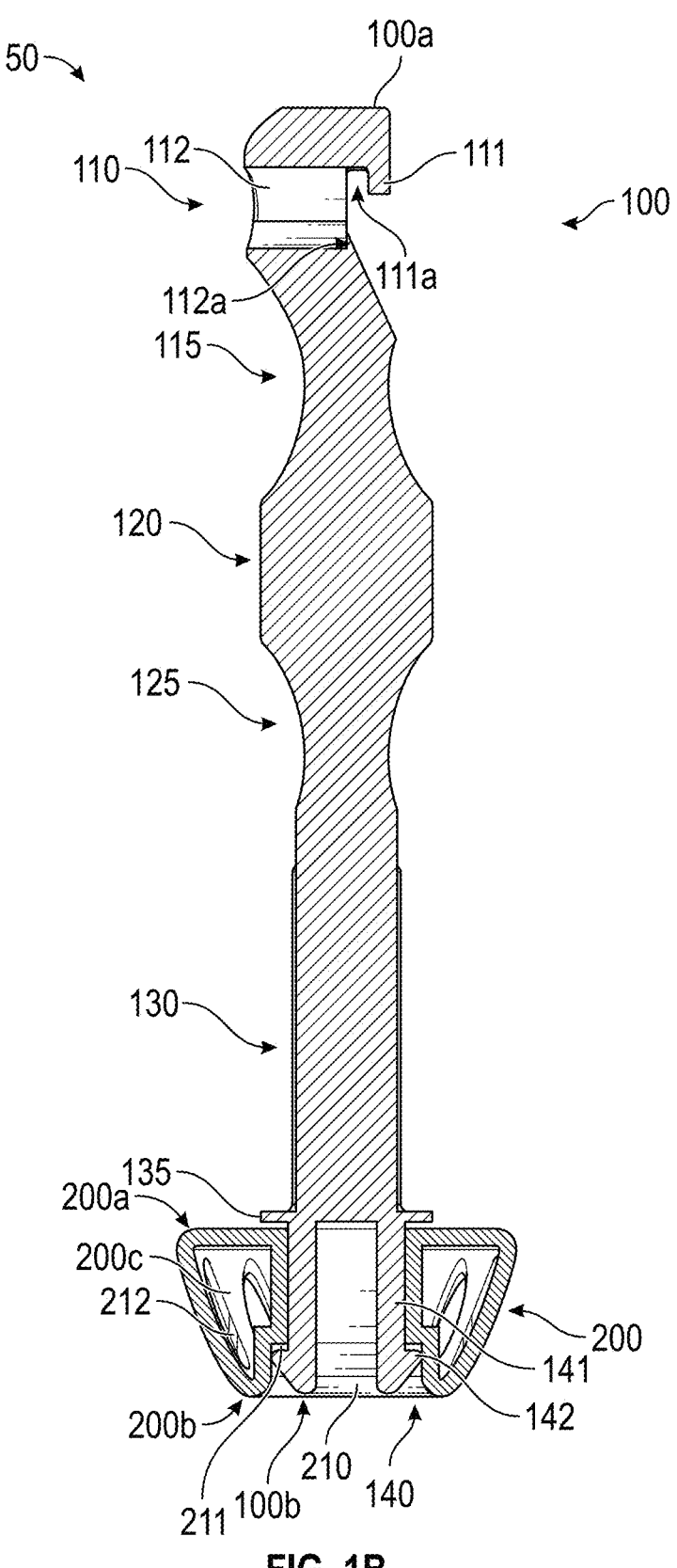
FIG. 1B is a cross-sectional side view of the fly tying tool of FIG. 1A.
Figure 1C:
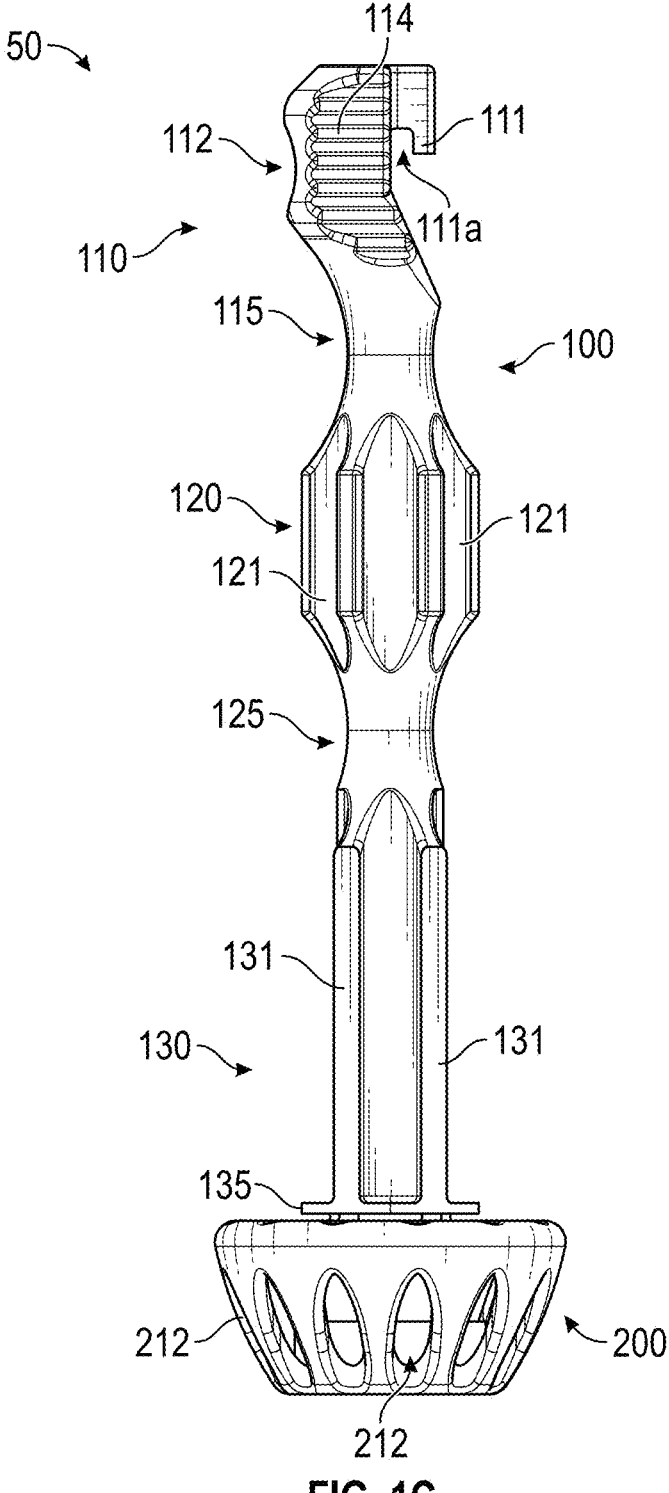
FIG. 1C is a side view of the fly tying tool of FIG. 1A.
Figures 1D, 1E:
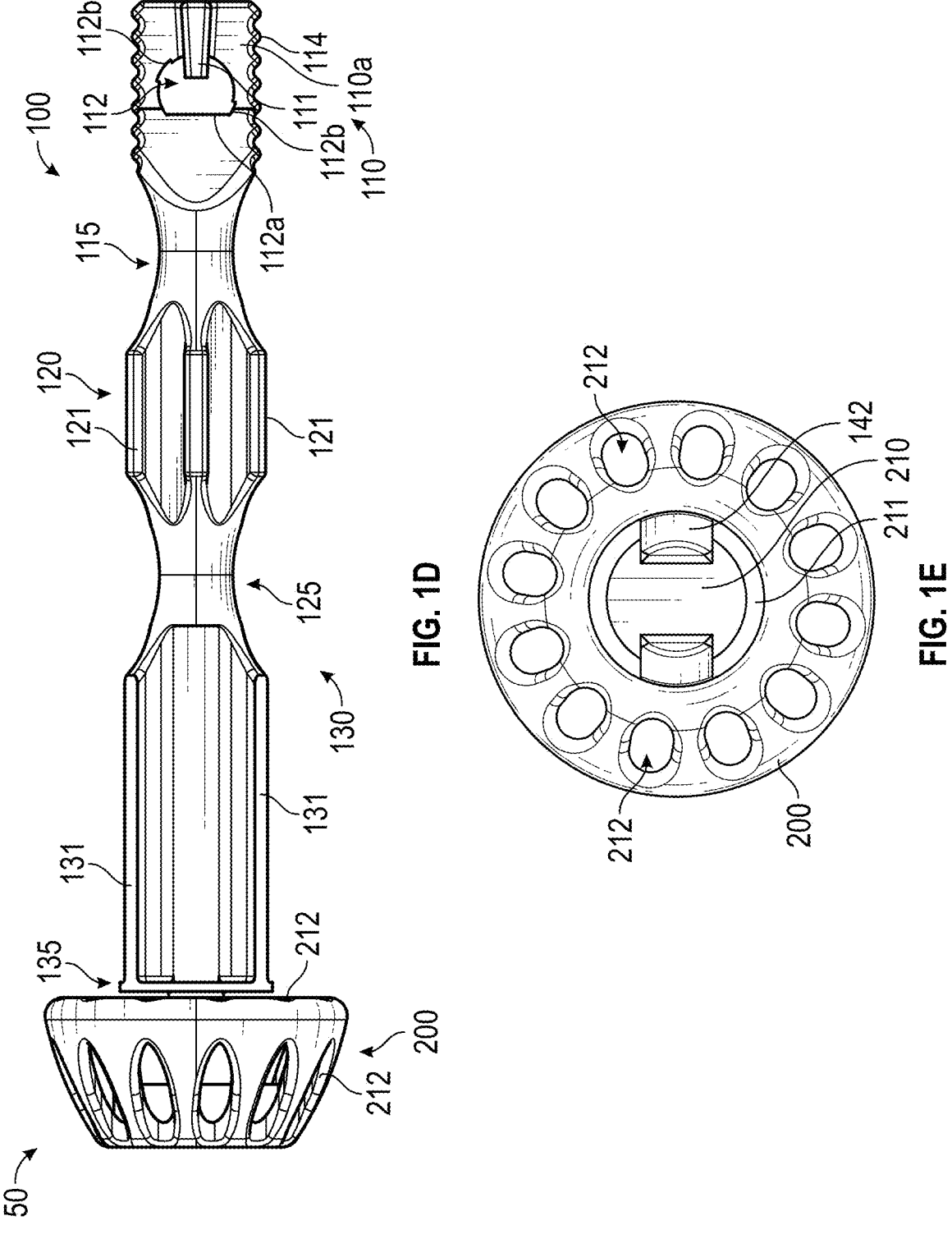
FIG. 1D is a front view of the fly tying tool of FIG. 1A.
FIG. 1E is a bottom view of the fly tying tool of FIG. 1A.
Figure 1F:
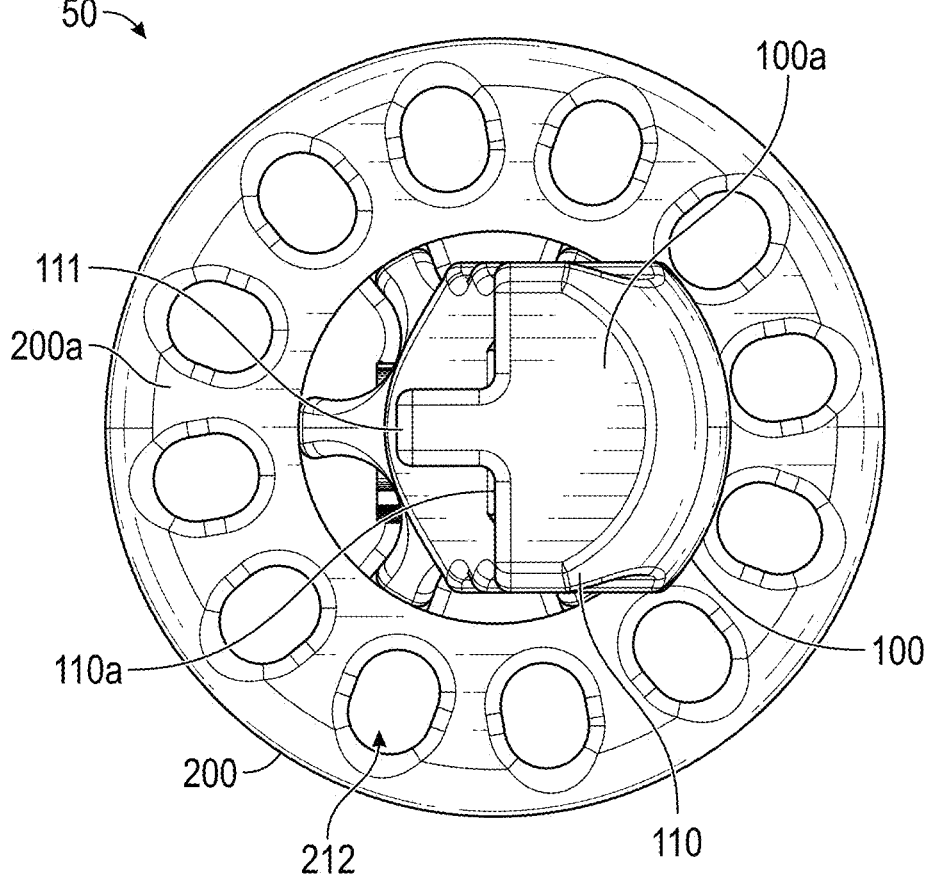
FIG. 1F is a top view of the fly tying tool of FIG. 1A.
Figure 1G:
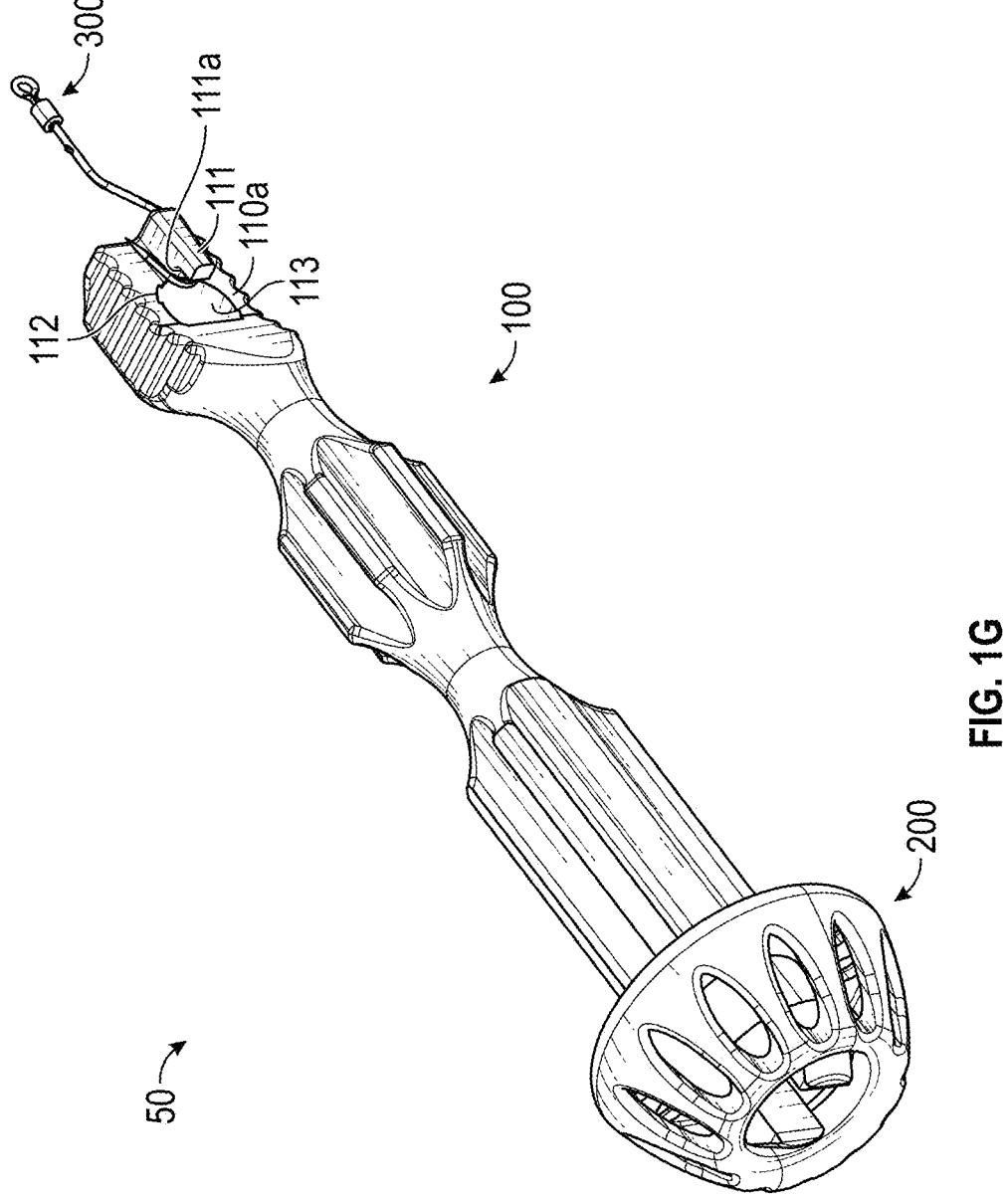
FIG. 1G is a perspective view of the fly tying tool of FIG. 1A showing the fly tying tool holding a fly.

FIGS. 1A-1G are various views of a fly tying tool 50 that is configured in accordance with embodiments of the present disclosure. Fly tying tool 50 includes a shaft 100 and a base 200 that is rotatably connected to shaft 100. A first end 100$a$ of shaft 100 is configured to receive and secure a fly 300 as shown in FIG. 1G. A second end 100$b$ of shaft 100 is coupled with base 200.

Shaft 100 includes a fly securing portion 110, a gripping portion 120, a first connecting portion 115 that connects fly securing portion 110 to gripping portion 120, an extension portion 130, a second connecting portion 125 that connects extension portion 130 to gripping portion 120, and a coupling portion 140. In some embodiments, first connecting portion 115 and second connecting portion 125 may be narrowed relative to the other portions of shaft 100.

FIG. 1B shows how base 200 may be coupled to shaft 100 in some embodiments. Base 200 may include a channel 210 that extends from a first end 200$a$ to a second end 200$b$ of base 200. Channel 210 may form a ledge 211 that may be recessed from second end 200$b$. Coupling portion 140 can include arms 141 that can be inserted through channel 210. Each arm 141 may form a tab 142 that interfaces with ledge 211 to retain coupling portion 140 within base 200. Channel 210, including ledge 211, may have a circular shape so that arms 141 can rotate fully within base 200. A stop feature 135 may be formed between coupling portion 140 and extension portion 130 to limit the insertion distance of coupling portion 140. Base 200 may have a hollow interior 200$c$ with openings 212 formed around the outer surface and first end 200$a$.

Fly securing portion 110 includes a hook feature 111 that is spaced from a face 110$a$ of fly securing portion 110 to form a pocket 111$a$ in which a fly 300 may be placed. An opening 112 may be formed through face 110$a$ to accommodate a magnet 113. Opening 112 may include a lip 112$a$ to prevent magnet 113 from passing beyond face 110$a$. Opening 112 may include notches 112$b$ that correspond with a shape of magnet 113 to prevent magnet 113 from rotating within opening 112.

As shown in FIG. 1G, fly 300 can be placed in pocket 111$a$ in contact with magnet 113. Magnet 113 will then hold fly 300 in place to facilitate tying fly 300. Hook feature 111 can also assist in holding fly 300 in place such as while shaft 100 is rotated relative to base 200. Then, once fly 300 is tied, it can be quickly removed by applying a pulling force on fly 300 away from magnet 113. The magnetic coupling of fly 300 facilitates the use of fly tying tool 50 in a variety of environments and situations such as when wearing gloves.

Fly tying tool 50 is configured to facilitate rotation of shaft 100 within base 200 using a single hand. For example, base 200 has a rounded shape that can be positioned in the palm. Shaft 100 can be sized to position gripping portion 120 at the fingertips when base 200 is in the palm. In this way, the user can grasp gripping portion 120 to rotate shaft 100 while base 200 is held in the palm to prevent its rotation. Gripping portion 120 can include grips 121 to facilitate this rotation.

In some embodiments, fly securing portion 110 may include grips 114 on opposing sides to facilitate gripping fly securing portion 110 while tying fly 300. In some embodiments, extension portion 130 may include reinforcing ribs 131.

FIGS. 2A-2E illustrate another example of a fly tying tool 50 that is configured in accordance with one or more embodiments of the present disclosure. In this example, fly tying tool 50 includes a fly securing portion 110 with an opening 112 for housing a magnet (not shown) which may be used in a similar manner as described above. Additionally, fly tying tool 50 as shown in these figures includes a threading structure 400 that is configured to simplify threading the line through the eye of the fly.

Figure 2A:
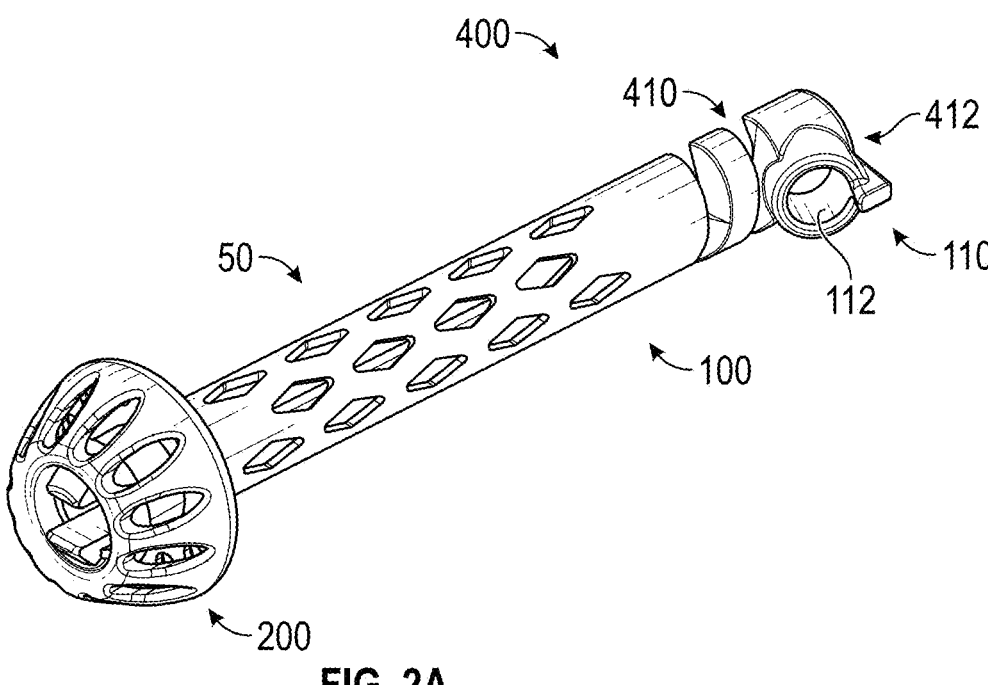
FIG. 2A is a perspective view of another fly tying tool that is configured in accordance with one or more embodiments of the present disclosure.
Figure 2B:
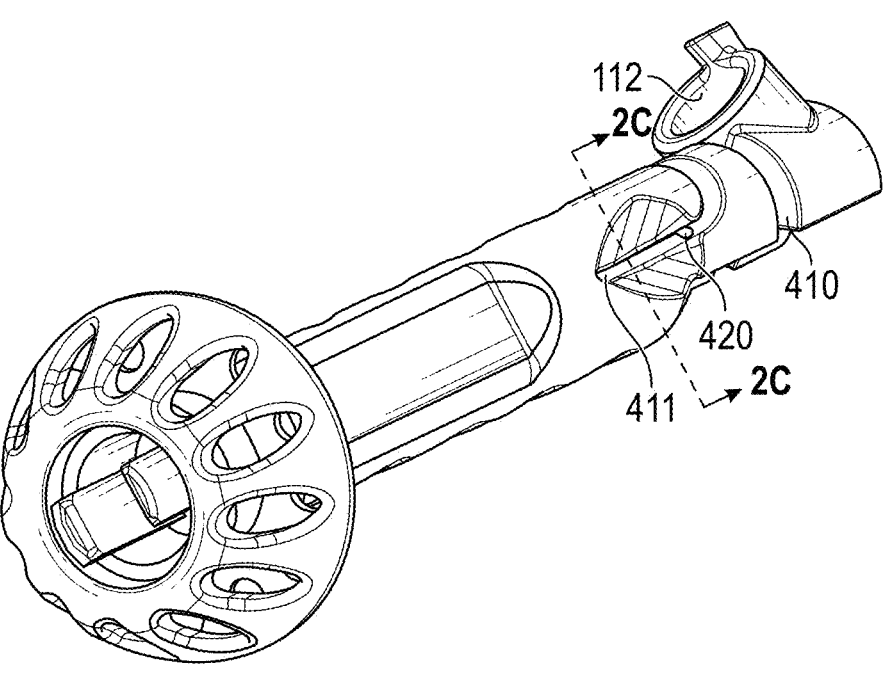
FIG. 2B is another perspective view of the fly tying tool of FIG. 2A.
Figure 2C:
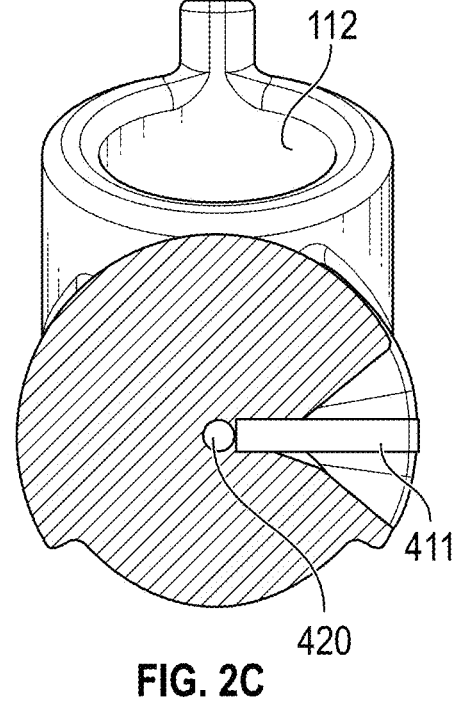
FIG. 2C is a cross-sectional bottom view of the fly tying tool of FIG. 2A.
Figure 2D:
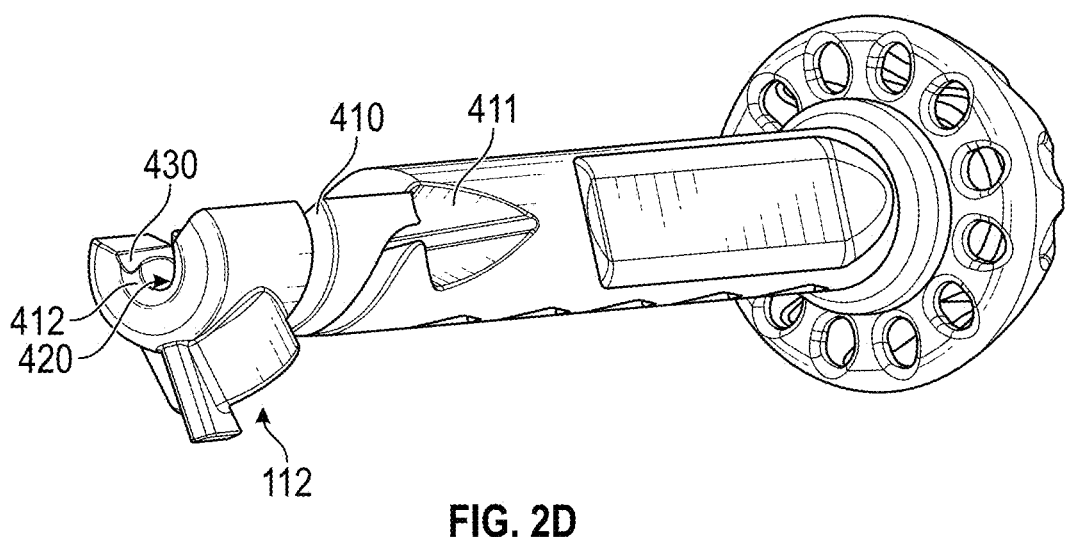
FIG. 2D is another perspective view of the fly tying tool of FIG. 2A.
Figure 2E:
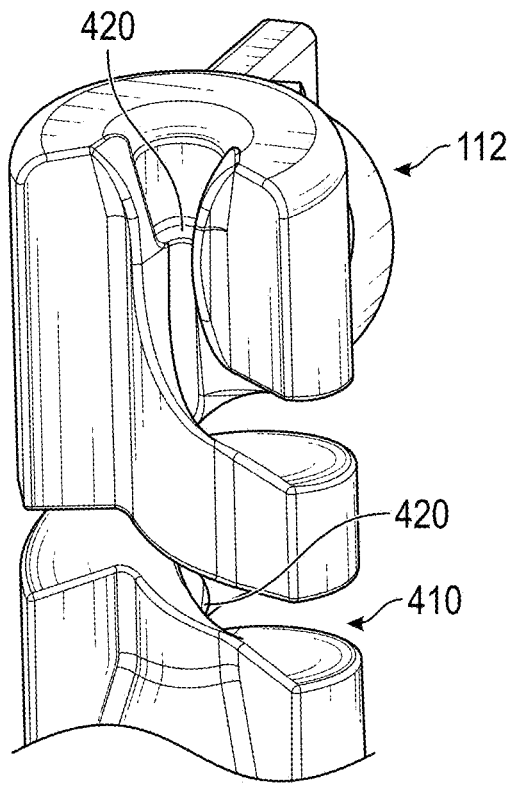
FIG. 2E is another perspective view of the fly tying tool of FIG. 2A.
Figure 3A:
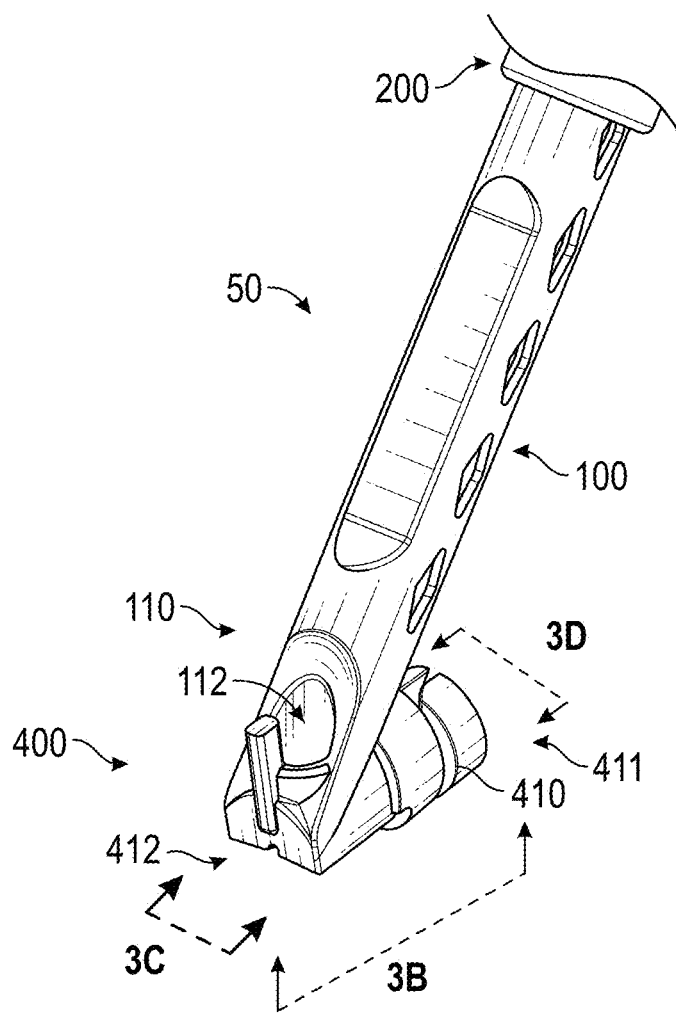
FIG. 3A is a perspective view of another fly tying tool that is configured in accordance with one or more embodiments of the present disclosure.
Figure 3B:
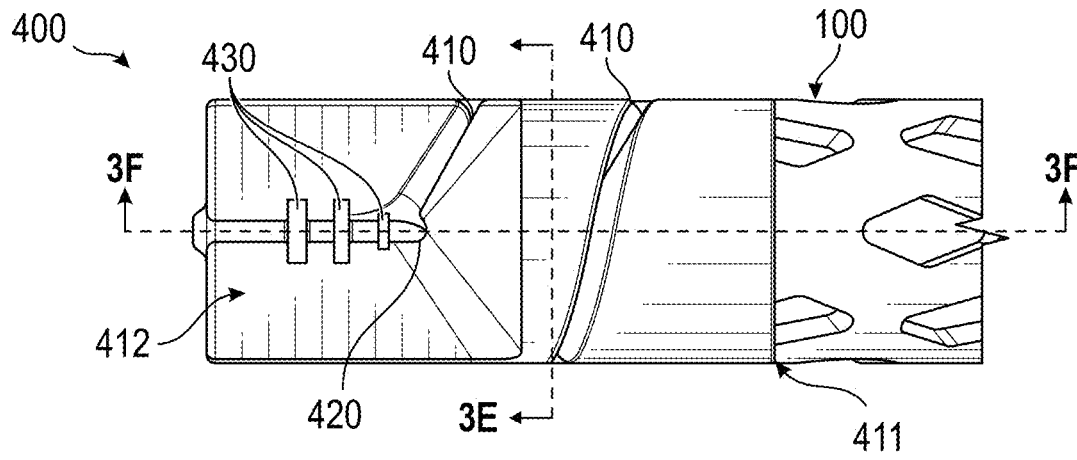
FIG. 3B-3D are side views of the fly tying tool of FIG. 3A.
Figure 3C:
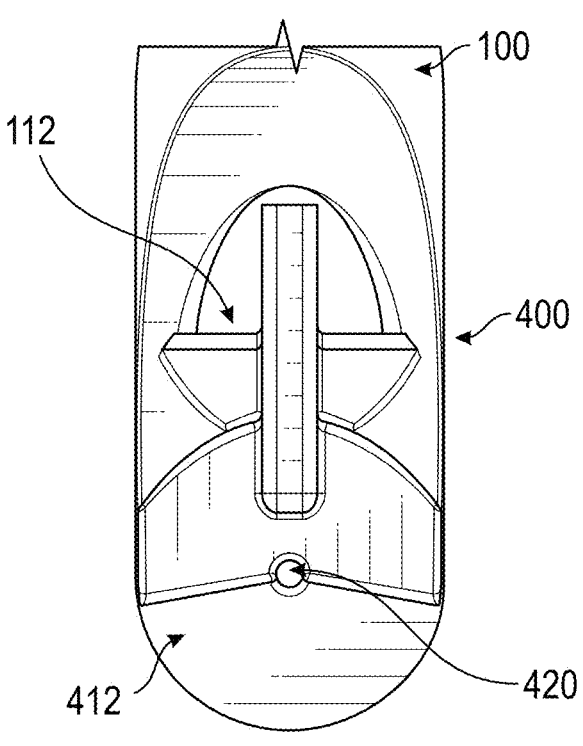
Figure 3D:
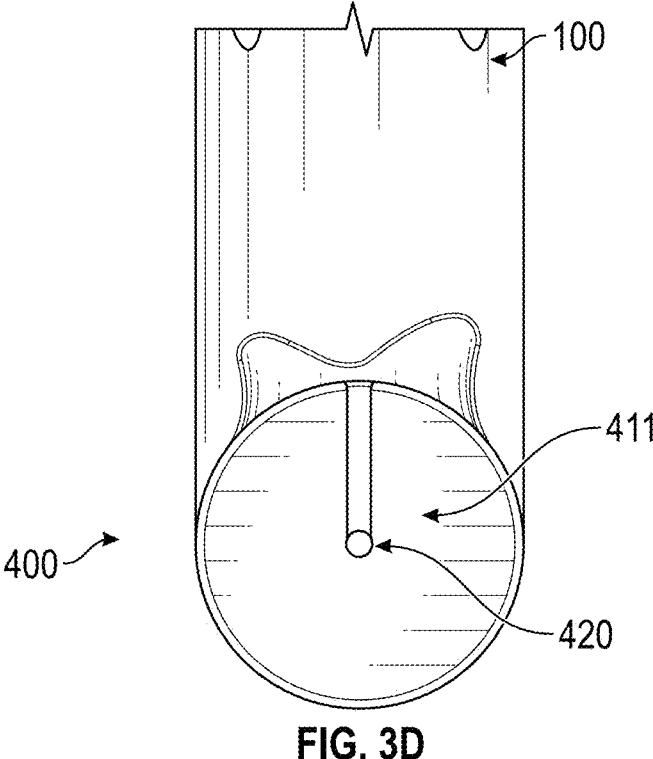
Figure 3E:
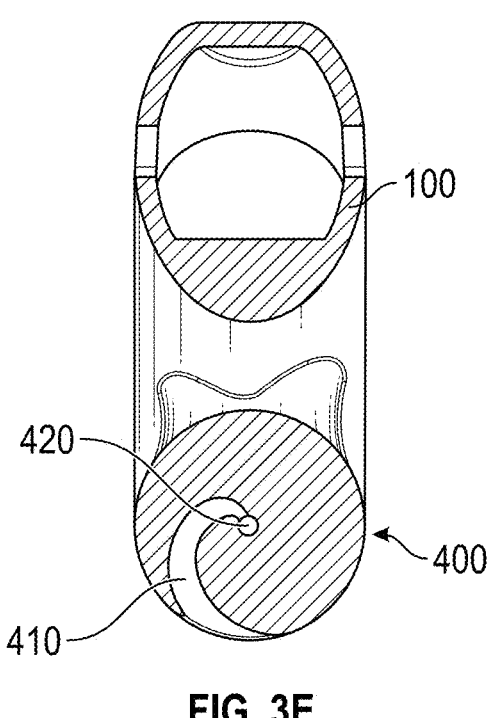
FIGS. 3E and 3F are cross-sectional views of the fly tying tool of FIG. 3A.
Figure 3F:
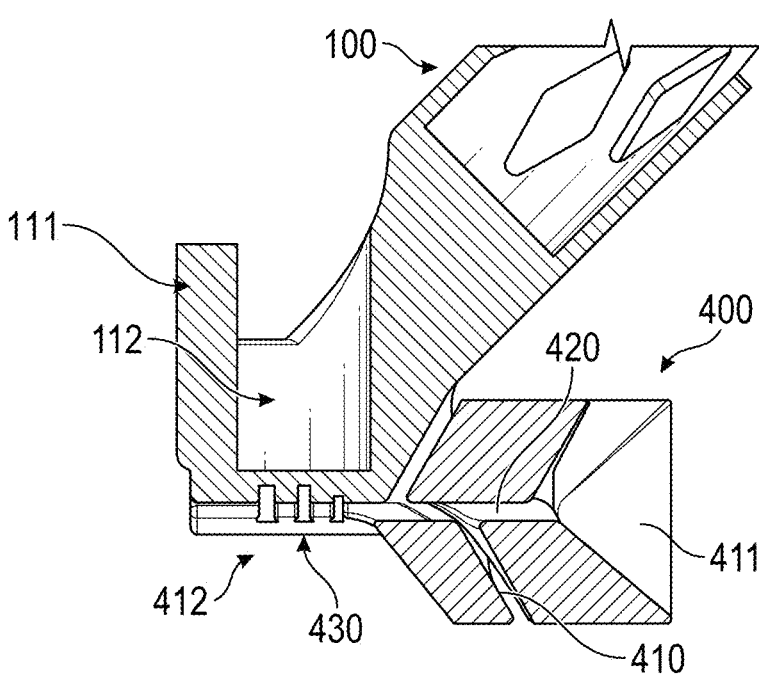

Threading structure 400 includes a spiral 410 (or spiraled recess) that extends from a bottom end 411 to a top end 412. Threading structure 400 also includes a central channel 420 that extends from bottom end 411 to top end 412 of spiral 410 as is best seen in the cross-sectional view of FIG. 2C. A fishing line can be inserted into central channel 420 via bottom end 411 and then out through central channel 420 via top end 412. As is best shown in FIG. 2E, top end 412 of spiral 410 can form an eye receiving area 430 in which the eye of the fly can be placed so that it is oriented generally perpendicular to (or overtop) central channel 420. In some embodiments, top end 412 may be flared and eye receiving area 430 may be in the form of a ridge inside the flared top end 412. Eye receiving area 430 is opposite the magnet (not shown) in opening 112 such that the fly will be held in place by the magnetic force with its eye overtop central channel 420. Accordingly, as the line is inserted through central channel 420, it will pass through the eye of the fly.

Once the line is threaded through the eye of the fly, the line can be removed from threading structure 400 by rotating shaft 100 relative to the line to thereby cause the line to be rotated through spiral 410 until it is free. Then, once the line is free, the fly can be secured to the magnet and tied in a similar manner as described above with references to FIGS. 1A-1G.

FIGS. 3A-3F illustrate another example of a fly tying tool 50 that is configured in accordance with one or more embodiments of the present disclosure. Similar to the embodiments represented in FIGS. 2A-2E, the embodiments represented in FIGS. 3A-3F include a threading structure 400. However, threading structure 400, and particularly bottom end 411, is not integrated into shaft 100 as in FIGS. 2A-2E but is formed on a separate extension that may be angled approximately 45 degrees from shaft 100. Also, in these embodiments, eye receiving area 430 may be formed as a plurality of recesses (or ridges) in/against which the eye of the fly may be placed to center the eye over central channel 420. A plurality of recesses (or ridges) may be used to accommodate different sized eyes.

The present disclosure may be embodied in other specific forms without departing from its spirit or essential characteristics. For example, any of the features of one described embodiment can be included on any other described embodiment. The described embodiments are to be considered in all respects only as illustrative and not restrictive. The scope of the invention is, therefore, indicated by the appended claims rather than by the foregoing description.

What is claimed:

1. A fly tying tool comprising:
   a base; and a shaft coupled to the base, wherein the shaft is configured to rotate relative to the base;

wherein the shaft includes a fly securing portion having a magnet for securing a fly;

wherein the shaft further includes a threading structure positioned on the shaft adjacent to the fly securing portion, the threading structure comprising a spiral defining a central channel, wherein the spiral is configured to guide a line through an eye of the fly while the fly is secured by the magnet.

2. The fly tying tool of claim 1, wherein the shaft is rotatably coupled to the base about a longitudinal axis.

3. The fly tying tool of claim 1, wherein the fly securing portion includes a hook feature that extends outward from and is spaced from the magnet to form a recess configured to receive a portion of the fly.

4. The fly tying tool of claim 3, wherein the magnet is positioned at a face of the fly securing portion facing the threading structure.

5. The fly tying tool of claim 4, wherein the magnet is positioned within an opening in the face such that the fly is seated within the opening during use.

6. The fly tying tool of claim 1, wherein the spiral has a bottom end and a top end, the central channel extending from the bottom end to the top end, the central channel being sized and shaped to receive and direct the line toward the eye of the fly.

7. The fly tying tool of claim 6, wherein the top end of the spiral forms an eye receiving area for aligning the eye of the fly over the central channel such that the line is guided through the eye by movement along the spiral.

8. The fly tying tool of claim 7, wherein the eye receiving area is positioned adjacent to the magnet so that the eye of the fly is aligned with the central channel while the fly is magnetically secured.

9. The fly tying tool of claim 1, wherein the threading structure is formed on an extension from the shaft projecting from the fly securing portion.

10. The fly tying tool of claim 1, wherein the threading structure is integrated into the shaft along a longitudinal portion thereof.

11. A fly tying tool comprising:

a base; and a shaft coupled to the base, the shaft being rotatable relative to the base;

wherein the shaft includes a threading structure comprising a spiral having a bottom end and a top end and a central channel that extends from the bottom end to the top end;

wherein the central channel is configured to guide a line through an eye of a fly positioned at the top end of the spiral;

wherein the spiral is configured such that, as the shaft is rotated, the line is routed through the central channel until the line is freed from the top end of the spiral thereby threading the line through the eye of the fly.

12. The fly tying tool of claim 11, wherein the top end of the spiral forms an eye receiving area configured to position the eye of the fly in alignment with the central channel.

13. The fly tying tool of claim 12, wherein the shaft includes a fly securing portion having a magnet for securing a fly positioned adjacent to the eye receiving area.

14. A fly tying tool comprising:

a base having a first end and a second end and a channel that extends from the first end to the second end; and a shaft comprising a first end forming a fly securing portion and a second end forming a coupling portion that inserts into the channel in the base to secure the shaft to the base, wherein the shaft is rotatable within the channel in the base, wherein the fly securing portion includes a magnet for securing a fly to the shaft, wherein the shaft further includes a threading structure comprising a spiral positioned adjacent to the fly securing portion and defining a central channel configured to guide a line through an eye of the fly.

15. The fly tying tool of claim 14, wherein the fly securing portion includes a hook feature that extends beyond the magnet and cooperates with the magnet to position the fly.

16. The fly tying tool of claim 14, wherein the spiral has a top end that forms a fly receiving area, the fly receiving area being positioned adjacent to the magnet and aligned with the magnet to position the eye of the fly over the spiral.

17. The fly tying tool of claim 16, wherein the spiral has a bottom end that is formed on an extension from the shaft and is configured to receive a line prior to guiding the line toward the fly receiving area.

18. The fly tying tool of claim 6, wherein the spiral is configured such that the line enters the bottom end and exits the top end through the eye of the fly without manual threading of the eye.

19. The fly tying tool of claim 11, wherein the spiral is configured such that the line enters the bottom end and exits the top end through the eye of the fly without manual threading of the eye.

20. The fly tying tool of claim 17, wherein the spiral is configured such that the line enters the bottom end and exits the top end through the eye of the fly without manual threading of the eye.

* * * * *